(12) United States Patent
Chandran et al.

(10) Patent No.: US 9,769,203 B2
(45) Date of Patent: Sep. 19, 2017

(54) METHODS, SYSTEMS, AND APPARATUS FOR MITIGATING NETWORK-BASED ATTACKS

(71) Applicants: Lakshmy Chandran, Bangalore (IN); Parsewar Kunal, Bangalore (IN); Manasa Ranjan Tripathy, Bangalore (IN); Ganesh Vaitheeswaran, Bangalore (IN); Vishnu Gowda Harish, Bangalore (IN); Praveen S, Bangalore (IN)

(72) Inventors: Lakshmy Chandran, Bangalore (IN); Parsewar Kunal, Bangalore (IN); Manasa Ranjan Tripathy, Bangalore (IN); Ganesh Vaitheeswaran, Bangalore (IN); Vishnu Gowda Harish, Bangalore (IN); Praveen S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/492,254

(22) Filed: Sep. 22, 2014

(65) Prior Publication Data

US 2016/0088014 A1    Mar. 24, 2016

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC ...... *H04L 63/1466* (2013.01); *H04L 63/0227* (2013.01); *H04L 63/1408* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 5,875,296 A | 2/1999 | Shi et al. | |
| 7,769,851 B1 | 8/2010 | Guruswamy et al. | |
| 8,046,827 B2* | 10/2011 | Corella | G06F 21/31 713/168 |
| 8,266,267 B1 | 9/2012 | Guruswamy et al. | |
| 8,316,443 B2 | 11/2012 | Rits et al. | |
| 8,321,678 B2 | 11/2012 | Hofmann et al. | |
| 8,401,994 B2 | 3/2013 | Hoang et al. | |
| 8,621,610 B2 | 12/2013 | Oberheide et al. | |
| 8,687,485 B1 | 4/2014 | Dondeti et al. | |
| 2002/0184217 A1* | 12/2002 | Bisbee | G06F 21/33 |
| 2003/0076848 A1* | 4/2003 | Bremler-Barr | H04L 12/2602 370/412 |

(Continued)

*Primary Examiner* — Dede Zecher
*Assistant Examiner* — Vadim Savenkov
(74) *Attorney, Agent, or Firm* — Schwegman Lundberg & Woessner, P.A.

(57) ABSTRACT

Methods, systems, computer program products, and articles of manufacture for mitigating a network-based attack are described. A first request associated with a transaction is obtained and a tracking identifier of the first request is associated with the transaction. A count of outstanding requests associated with a user is compared to a throttling limit. If the count of outstanding requests associated with the user is greater than the throttling limit, processing of the first request may be denied.

19 Claims, 24 Drawing Sheets

(56) References Cited

U.S. PATENT DOCUMENTS

| | | | |
|---|---|---|---|
| 2005/0022000 A1* | 1/2005 | Inomata | G06F 21/55 |
| | | | 726/26 |
| 2005/0203851 A1* | 9/2005 | King | G06F 17/30067 |
| | | | 705/51 |
| 2006/0053487 A1* | 3/2006 | Jeffries | H04L 63/1458 |
| | | | 726/22 |
| 2009/0077632 A1 | 3/2009 | Carpenter et al. | |
| 2010/0192201 A1* | 7/2010 | Shimoni | G06F 21/55 |
| | | | 726/3 |
| 2011/0138123 A1 | 6/2011 | Gurajada et al. | |
| 2012/0174217 A1* | 7/2012 | Ormazabal | H04L 63/1458 |
| | | | 726/22 |
| 2012/0260329 A1 | 10/2012 | Suffling | |
| 2012/0266231 A1 | 10/2012 | Spiers et al. | |
| 2013/0031600 A1 | 1/2013 | Luna et al. | |
| 2013/0080388 A1 | 3/2013 | Dwyer et al. | |
| 2013/0179947 A1 | 7/2013 | Kline, III et al. | |
| 2013/0205390 A1* | 8/2013 | Hauck | H04L 63/1408 |
| | | | 726/22 |
| 2014/0019488 A1* | 1/2014 | Wo | G06F 21/6218 |
| | | | 707/784 |
| 2014/0259145 A1* | 9/2014 | Khandelwal | H04L 63/1458 |
| | | | 726/13 |
| 2014/0304393 A1* | 10/2014 | Annamalaisami | H04L 43/04 |
| | | | 709/224 |

* cited by examiner

| REQUEST_ID | REQ_123456789_1 |
| --- | --- |
| USER_ID | TESTUSER |
| DATASET_ID | DATASET_123456789_1 |
| STATE | 0 |
| FILE_NAME | DATA_1.CSV |
| CREATION_TIME | 118976565353 |

| ND7 - SAP_BI_DISCOVER.sap.bi.da.db.tables::DATASET_MASTER | ND7 - SQL Console 1 |
|---|---|

ND7 (SYSTEM) inblrlf1074.dhcp.blrl.sap.corp 00

SELECT TOP 1000 * FROM "SAP_BI_DISCOVER"."sap.bi.da.db.tables::DATASET_MASTER"

| SCHEMA_NAME | DATASET_NAME | FILE_NAME | IS_UPLOADED | UPLOAD_TIME | STATUS | CURRENT_COUNT | TOTAL_COUNT | ERROR_MSG |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |
| | | | | | | | | |

| ND7 - SQL Console 1 | ND7 - SAP_BI_DISCOVER.sap.bi.da.db.tables::DATASET_MASTER | | | | |
|---|---|---|---|---|---|
| ND7 (SYSTEM) inblrl1074.dhcp.blrl.sap.corp 00 | | | | | |
| SELECT TOP 1000 * FROM "SAP_BI_DISCOVER" . "sap.bi.da.db.tables::DATASET_MASTER" | | | | | |
| | SCHEMA_NAME | FILE_NAME | USER_ID | STATE | REQ_ID | CREATION_TIME |
| 1 | TESTUSER1 | 142c2d09-2248-4763-b635-79438da82ec4 | 179,595 | 0 | 142c2d07-f1b3-4cff-870f-21531aa8a838 | Dec 5, 2013 2:51:59 PM.692 |

| ND7 - SQL Console 1 | ND7 - SAP_BI_DISCOVER.sap.bi.da.db.tables::DATA_MASTER | | | |
|---|---|---|---|---|

ND7 (SYSTEM) inblhl1074.dhcp.blrl.sap.corp 00

SELECT TOP 1000 * FROM "SAP_BI_DISCOVER"."sap.bi.da.db.tables::DATASET_MASTER"

| | SCHEMA_NAME | FILE_NAME | USER_ID | STATE | REQ_ID | CREATION_TIME |
|---|---|---|---|---|---|---|
| 1 | TESTUSER1 | 142c2cd09-2248-4763-b635-794386da82ec4 | 179,595 | 1 | 142c2d07-f1b3-4cff-870f-21531aa8a838 | Dec 5, 2013 2:51:59 PM.692 |

| | SCHEMA_NAME | FILE_NAME | USER_ID | STATE | REQ_ID | CREATION_TIME |
|---|---|---|---|---|---|---|
| 1 | TESTUSER1 | 142c2d09-2248-4763-b635-79438da82ec4 | 179,595 | 2 | 142c2d07-f1b3-4cff-870f-21531aa8a838 | Dec 5, 2013 2:51:59 PM.692 |

ND7 - SQL Console 1 | ND7 - SAP_BI_DISCOVER.sap.bi.da.db.tables::DATA_MASTER

ND7 (SYSTEM) inblrl1074.dhcp.blrl.sap.corp 00

SELECT TOP 1000 * FROM "SAP_BI_DISCOVER" . "sap.bi.da.db.tables::DATASET_MASTER"

| ND7 - SQL Console 1 | ND7 - SAP_BI_DISCOVER.sap.bi.da.db.tables::DATA_MASTER | | | | |
|---|---|---|---|---|---|
| ND7 (SYSTEM) inblrl11074.dhcp.blrl.sap.corp 00 | | | | | |
| SELECT TOP 1000 * FROM "SAP_BI_DISCOVER"."sap.bi.da.db.tables::DATASET_MASTER" | | | | | |
| | SCHEMA_NAME | FILE_NAME | USER_ID | STATE | REQ_ID | CREATION_TIME |
| 1 | TESTUSER1 | 142c2d09-2248-4763-b635-794338da82ec4 | 179,595 | 3 | 142c2d07-f1b3-4cff-870f-21531aa8a838 | Dec 5, 2013 2:51:59 PM.692 |

| ND7 - SQL Console 1 | ND7 - SAP_BI_DISCOVER.sap.bi.da.db.tables::DATA_MASTER | | | | |
|---|---|---|---|---|---|
| ND7 (SYSTEM) inblrll1074.dhcp.blrl.sap.corp 00 | | | | | |
| SELECT TOP 1000 * FROM "SAP_BI_DISCOVER"."sap.bi.da.db.tables::DATASET_MASTER" | | | | | |
| SCHEMA_NAME | FILE_NAME | USER_ID | STATE | REQ_ID | CREATION_TIME |
| | | | | | |
| | | | | | |
| | Entry is updated and then deleted | | | | |
| | | | | | |
| | | | | | |

METHODS, SYSTEMS, AND APPARATUS FOR MITIGATING NETWORK-BASED ATTACKS

FIELD

The present disclosure relates, generally, to mitigating a network-based attack. In an example embodiment, the disclosure relates to mitigating a replay attack.

BACKGROUND

A replay attack is a form of network attack in which a data transmission via, for example, hypertext transfer protocol (HTTP) requests are repeated or delayed, typically in a malicious manner. A replay attack may occur when an attacker copies a stream of messages between two parties and replays the stream to one or more of the parties. In the case of, for example, a web application that lets users upload data to a backend server, a large amount of data may be transmitted across the network as an HTTP upload request. The request may be captured as it traverses the system (e.g., traverses the network, servers, and the like the request may be resent any number of times. In some cases, a user may maliciously resend the request in an attack on the infrastructure. Unless mitigated, the computers subject to the attack may process the stream as legitimate messages, resulting in a range of consequences, such as redundant orders of an item. For example, if a server inserts data into a database table in response to the maliciously resent requests, the database may grow and may eventually be filled up with data from the replayed requests. In this situation, the server may fail.

BRIEF DESCRIPTION OF DRAWINGS

The present disclosure is illustrated by way of example and not limitation in the figures of the accompanying drawings, in which like references indicate similar elements and in which:

FIG. 7 is an example screenshot of a database table before a file is uploaded, in accordance with an example embodiment;

FIG. 9 is an example screenshot of the database table after the file content has been sent to the server, in accordance with an example embodiment;

FIG. 11 is an example screenshot of a captured POST request, in accordance with an example embodiment;

FIG. 12 is an example screenshot of the database state after the transition to STATE 1, in accordance with an example embodiment;

FIG. 13 is an example screenshot of the request/response after the data has been inserted in the database, in accordance with an example embodiment;

FIG. 14 is an example screenshot of the database state after the transition to STATE 2; in accordance with an example embodiment;

FIG. 15 is an example screenshot of the request/response after the alter table request, in accordance with an example embodiment;

FIG. 16 is an example screenshot of the database state after the transition to STATE 3, in accordance with an example embodiment;

FIG. 17 is an example screenshot of a response to a create analytical view request, in accordance with an example embodiment;

FIG. 18 illustrates the removal of the DSM entry, in accordance with an example embodiment;

FIG. 20 is an example screenshot showing the detection and capture of an invalid request, in accordance with an example embodiment;

DETAILED DESCRIPTION

Figure 1A:
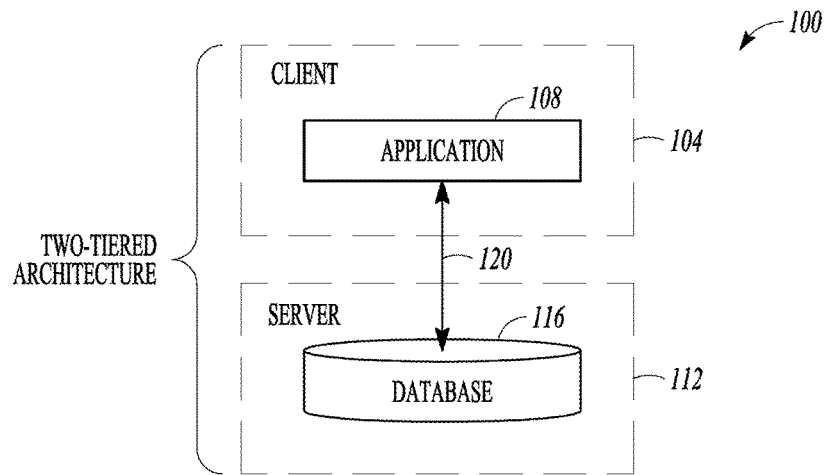
FIGS. 1A and 1B illustrate schematic diagrams of example systems for mitigating a network-based attack, in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Generally, methods, systems, apparatus, and computer programs for mitigating a network-based attack are disclosed. In one example embodiment, mitigating an attack may constitute pre venting the attack. In one example embodiment, one or more of the following features may be provided: 1) throttling the number of parallel requests permitted for a user; 2) provisioning a unique tracking identifier for all the requests in one transaction; and 3) providing persistence of the transaction state.

In one embodiment, a user may create analytical views and visualizations using uploaded data, such as data uploaded via a message request. The system may be a cloud-based and/or web-based, self-service business intelligence (BI) solution that may enable users to acquire data, analyze data, and collaborate with colleagues on data creation, visualizations, and other business intelligence artifacts. Users may be able to upload files from a client and may create visualizations based on various artifacts. Users may be able to connect to a data view, select a cube, and visualize data using a wide palette of graphical charts and tables.

In one example embodiment, a user may upload, download, publish, and share documents, making it possible to collaborate with teammates and colleagues. Datasets and analytics may be created, explored, and shared via web browsers and/or mobile devices. Documents may include Crystal Reports documents, Design Studio files, Microsoft Excel spreadsheets, CSV files, PowerPoint presentations, and the like.

In one example embodiment, the number of parallel requests, such as data upload requests, for a user may be throttled, thus limiting the total number of outstanding requests. For example, a throttle may be set to five messages. This may be achieved by configuring a limit to the number of requests that a valid user can issue at a given time. If the user exceeds the throttle limit, the user may be asked to wait for some time before submitting the next request and/or uploading the next dataset. If a user exceeds the throttle limit, the user be sent an error message and/or may be prevented from submitting additional messages. In one example embodiment, additional messages from the user may be ignored if the user exceeds the throttle limit.

In one example embodiment, a unique tracking identifier, such as a request identifier, may be issued for all of the requests in one transaction. The unique tracking identifier may be generated, for example, by a client and may be used as a transaction token for all the requests for the corresponding transaction, such as a corresponding file upload. A unique request identifier that is based on a time of the upload request initiated by the user may be used as the tracking identifier. The server may receive the initial request for the transaction and may check if any other transaction with the same tracking identifier is in process, indicating a potential replay attack. In one example embodiment, each request associated with the transaction may be assigned the same user identifier and authentication token.

The two cited checks (i.e., the throttling limit and the unique tracking identifier) may be performed using the persistent data stored in the server. If the number of requests that are in progress exceeds the configured throttling limit, the server may issue an error message. For valid requests, the server may generate another time-based unique identifier that may be used as a dataset identifier. In addition, a response indicating the successful completion of a request may have a dataset identifier generated by the server.

In one example embodiment, a sequence of steps may be defined that must be followed in order to execute a transaction and a persistence of the transaction state may be maintained during execution of the steps of the transaction. The server may track each request using the state of the transaction and the unique request identifier. A request that does not follow the defined sequence of steps (as indicated by the state of the transaction) may indicate a potential replay attack.

Figure 1B:
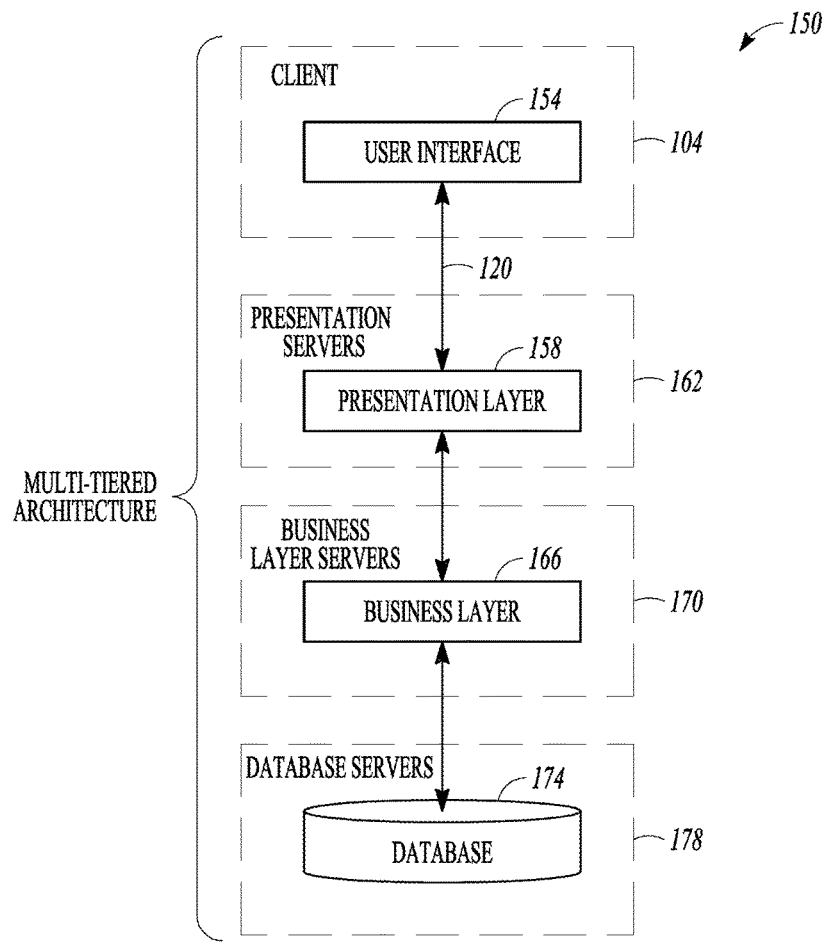

FIGS. 1A and 1B illustrate schematic diagrams of example systems 100, 150 for mitigating a network-based attack, in accordance with an example embodiment. Traditional client-server systems may employ a two-tiered architecture such as that illustrated by the system 100 in FIG. 1A. An application 108 executed on a client device 104 of the two-tiered architecture may be comprised of a monolithic set of program code including a graphical user interface component, presentation logic, business logic, and a network interface that enables the client device 104 to communicate over a network 120 with one or more servers 112. A database 116 may be maintained on the server 112 that provides non-volatile or "persistent" storage for the data accessed and/or processed by the application 108.

The "business logic" component of the application 108 may represent the core program code of the application 108, i.e., the rules governing the underlying business process (or other functionality) provided by the application 108. The "presentation logic" may describe the specific manner in which the results of the business logic are formatted for display on the user interface. The database 116 may include data access logic used by the business logic to store and retrieve data.

In response to limitations associated with the two-tiered client-server architecture, a multi-tiered architecture has been developed, as illustrated in FIG. 1B. In the multi-tiered system 150, a presentation layer 158, a business layer 166, and a database 174 may be logically separated from a user interface 154 of the application 108. These layers may be moved off of the client device 104 to one or more dedicated servers on the network 120. For example, the presentation layer 158, the business layer 166, and the database 174 may each be maintained on separate servers (e.g., presentation servers 162, business layer servers 170, and database servers 178).

This separation of logical components and the user interface 154 may provide a more flexible and scalable architecture compared to that provided by the two-tiered model of the system 100 in FIG. 1A. For example, the separation may ensure that all clients share a single implementation of the business layer 166. If business rules change, changing the current implementation of the business layer 166 to a new version may not call for updating any client-side program code. In addition, the presentation layer 158 may be provided, which generates code for a variety of different user interfaces 154, which may be standard browsers.

Figure 1C:
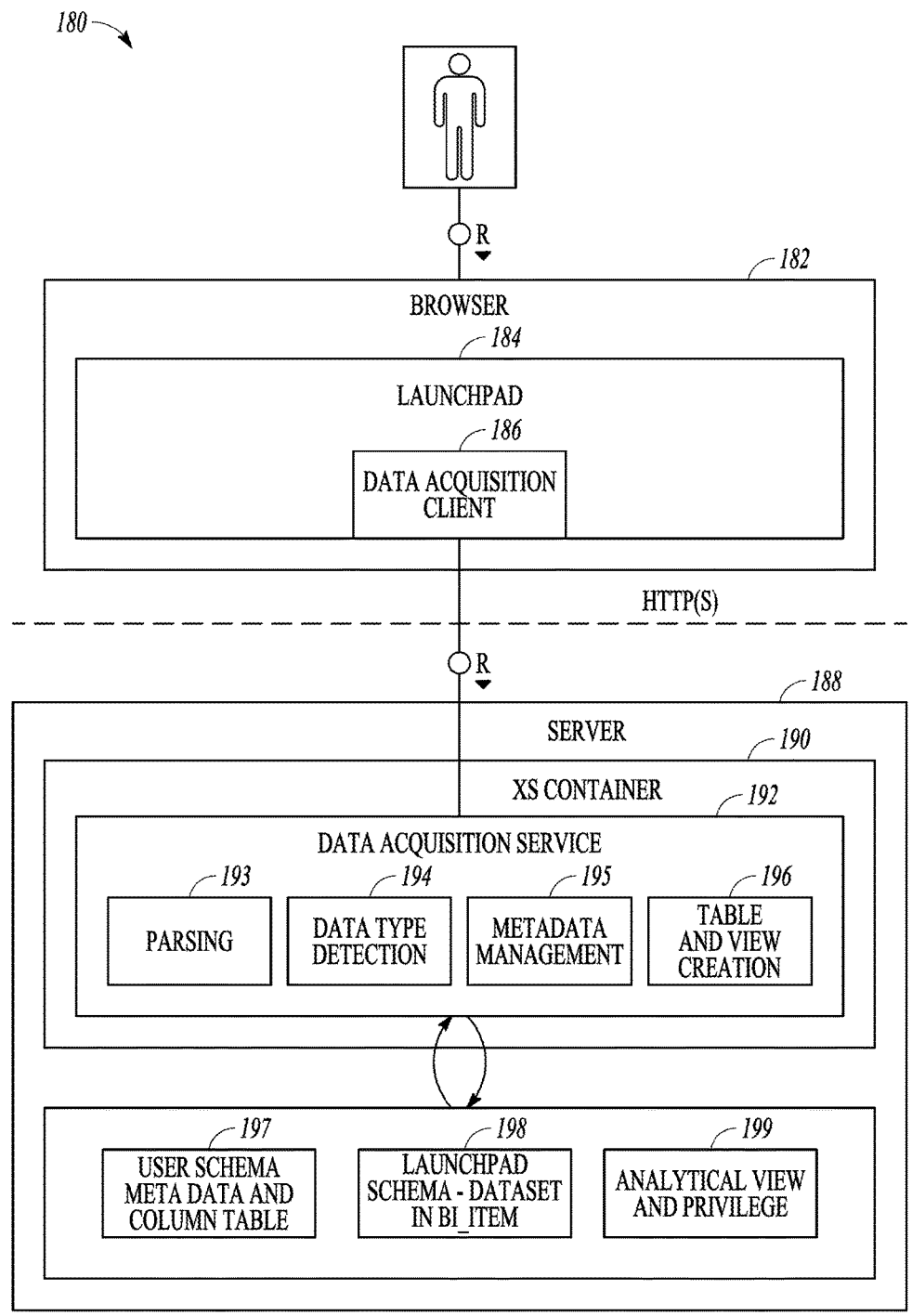
FIG. 1C is an object diagram depicting the entities involved in the usage of data acquisition, in accordance with an example embodiment.

FIG. 1C is an object diagram 180 depicting the entities involved in data acquisition, in accordance with an example embodiment. In one example embodiment, a user may utilize a browser 182 to execute a data acquisition operation on a server 188. The server 188 may comprise an XS Container 190 (an application server component) and a database component. The user may launch a data acquisition client 186 via a launchpad 184 on the browser 182. When the user uploads a file via HTTPS requests, various data acquisition services 192 deployed on the XS Container 190 are invoked. In one example embodiment, the data acquisition services 192 may include parsing 193, data type detection 194, metadata management 195, and table and view creation 196. The data acquisition services 192 perform various steps in the data acquisition process.

The data acquisition services 192 may interact with the data store (database) of the server 188 to populate data in the tables of the database. The data store may have various tables to store:

1. User schema metadata and column table 197—the metadata of the various documents uploaded by the user.
2. Launchpad schema 198—a list of datasets uploaded.
3. Analytical view and privilege 199—an analytical view created on top of the user's uploaded dataset.

Figure 2:
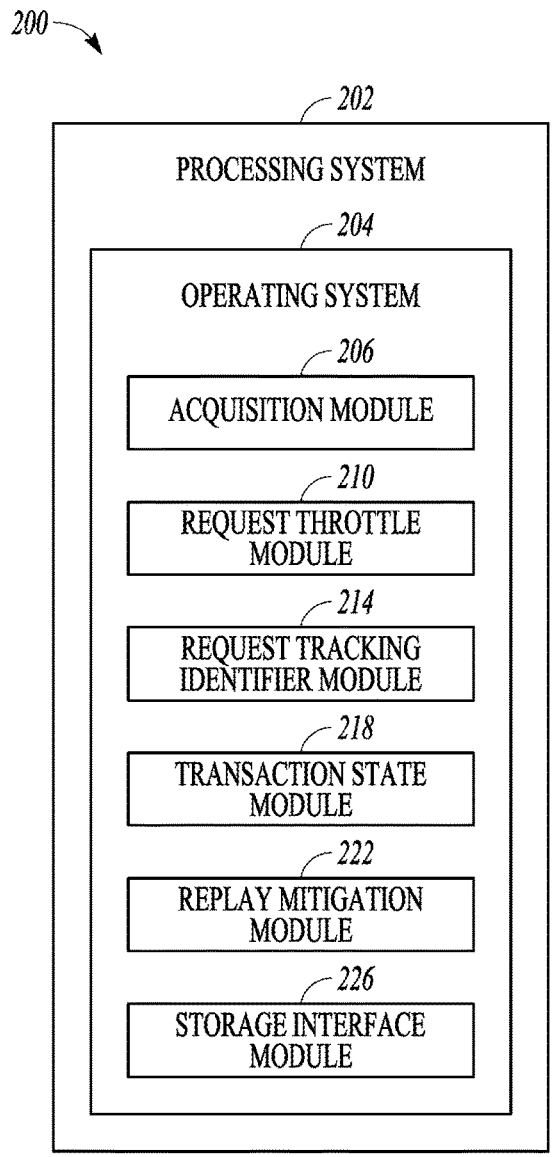
FIG. 2 is a block diagram of an example apparatus for mitigating a network-based attack, in accordance with an example embodiment.

FIG. 2 is a block diagram of an example apparatus 200 for mitigating a network-based attack, in accordance with an example embodiment. The apparatus 200 is shown to include a processing system 202 that may be implemented on a server, client, or other processing device that includes an operating system 204 for executing software instructions. In accordance with an example embodiment, the apparatus 200 may include an acquisition module 206, a request throttle module 210, a request tracking identifier module 214, a transaction state module 218, a replay mitigation module 222, and a storage interface module 226.

Figure 6A:
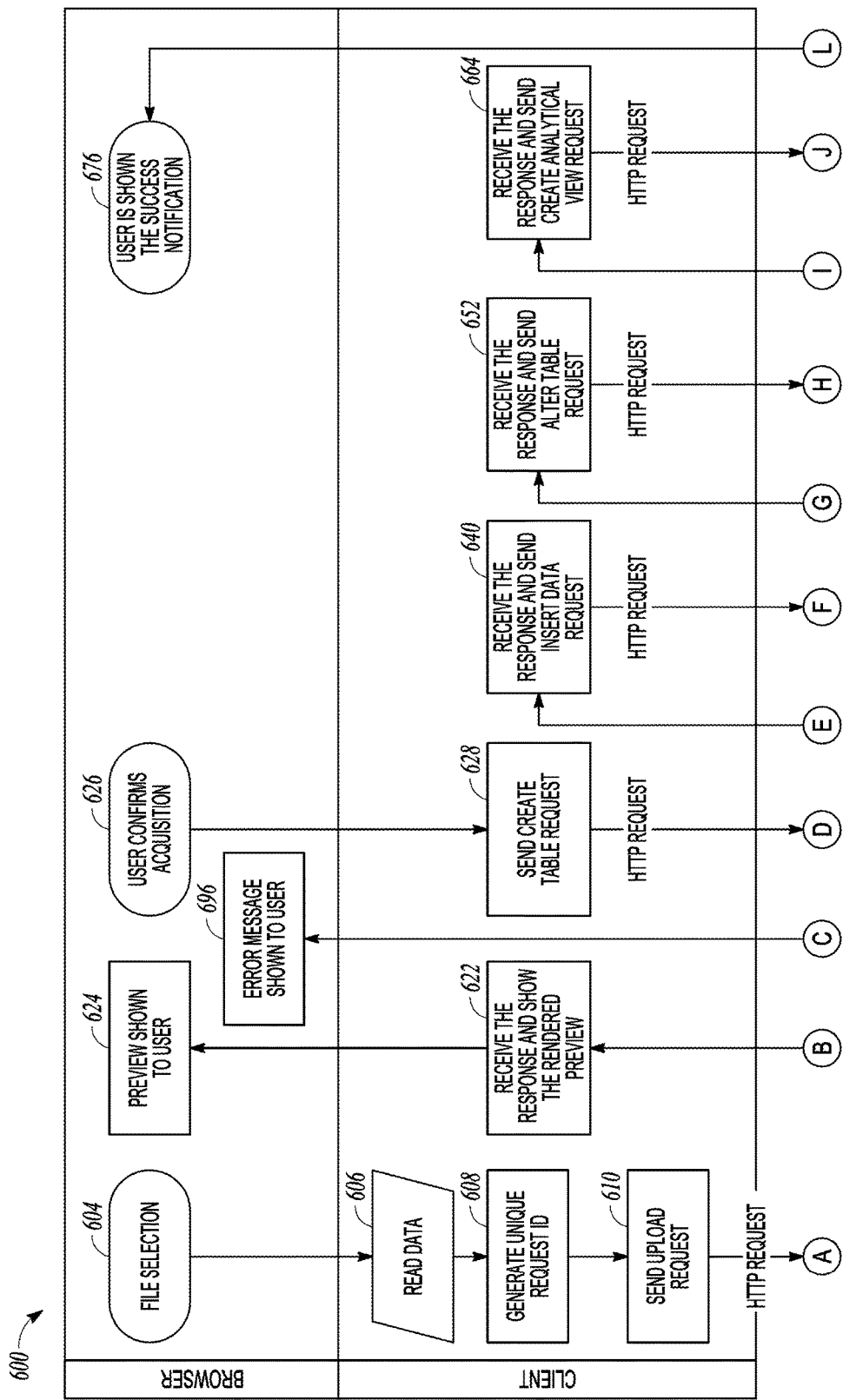
FIGS. 6A and 6B are a flowchart of an example workflow for management of a replay attack, in accordance with an example embodiment.
Figure 6B:
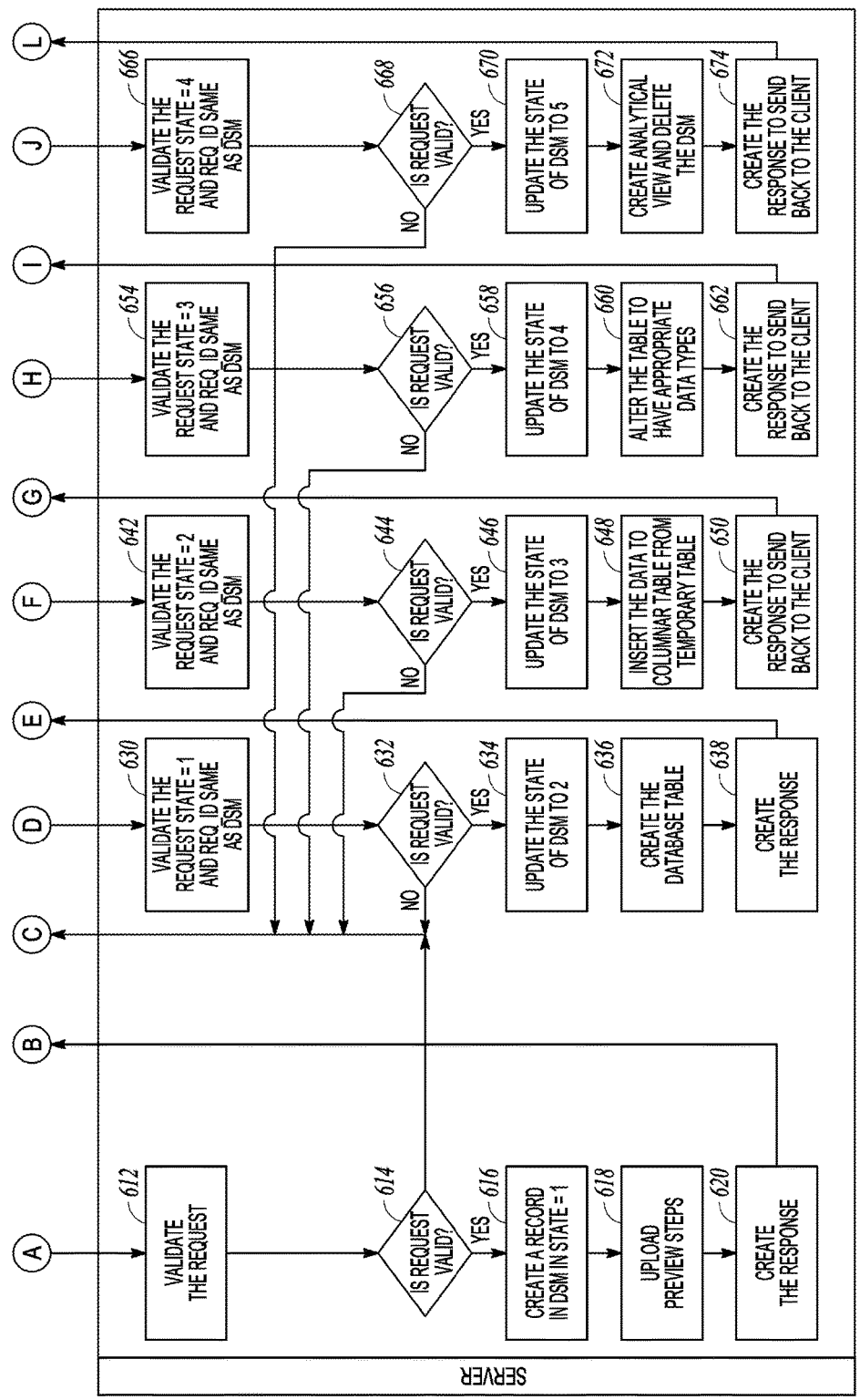

The acquisition module 206 may be responsible for conducting the server-side operations of the data acquisition, as described in FIGS. 6A and 6B. The acquisition module 206 may, for example, validate requests received by the server and may create, maintain, and delete the dataset master table for each valid transaction, as described more fully below.

The request throttle module 210 may be responsible for maintaining the current count of outstanding authorizations (e.g., requests) for each user and for enforcing the throttle limit in conjunction with the acquisition module 206. The request tracking identifier module 214 may be responsible for generating a request tracking identifier for each session and for ensuring that the tracking identifier of a received request matches the tracking identifier of the corresponding transaction identifier. The latter operation may be performed in conjunction with the acquisition module 206. The transaction state module 218 may be responsible for ensuring that the state of a received request matches the state of the session (e.g., state of the transaction). The replay mitigation module 222 may be responsible for issuing error messages if it detects a request that exceeds the throttling limit, detects a tracking identifier in a request that does not match a tracking identifier of a corresponding transaction, and/or detects a state of a request that does not match a state of a corresponding transaction.

The storage interface module 226 may provide access to various storage elements, such as the DATASET_MASTER, (DSM) table, as described more fully below.

Figure 3:
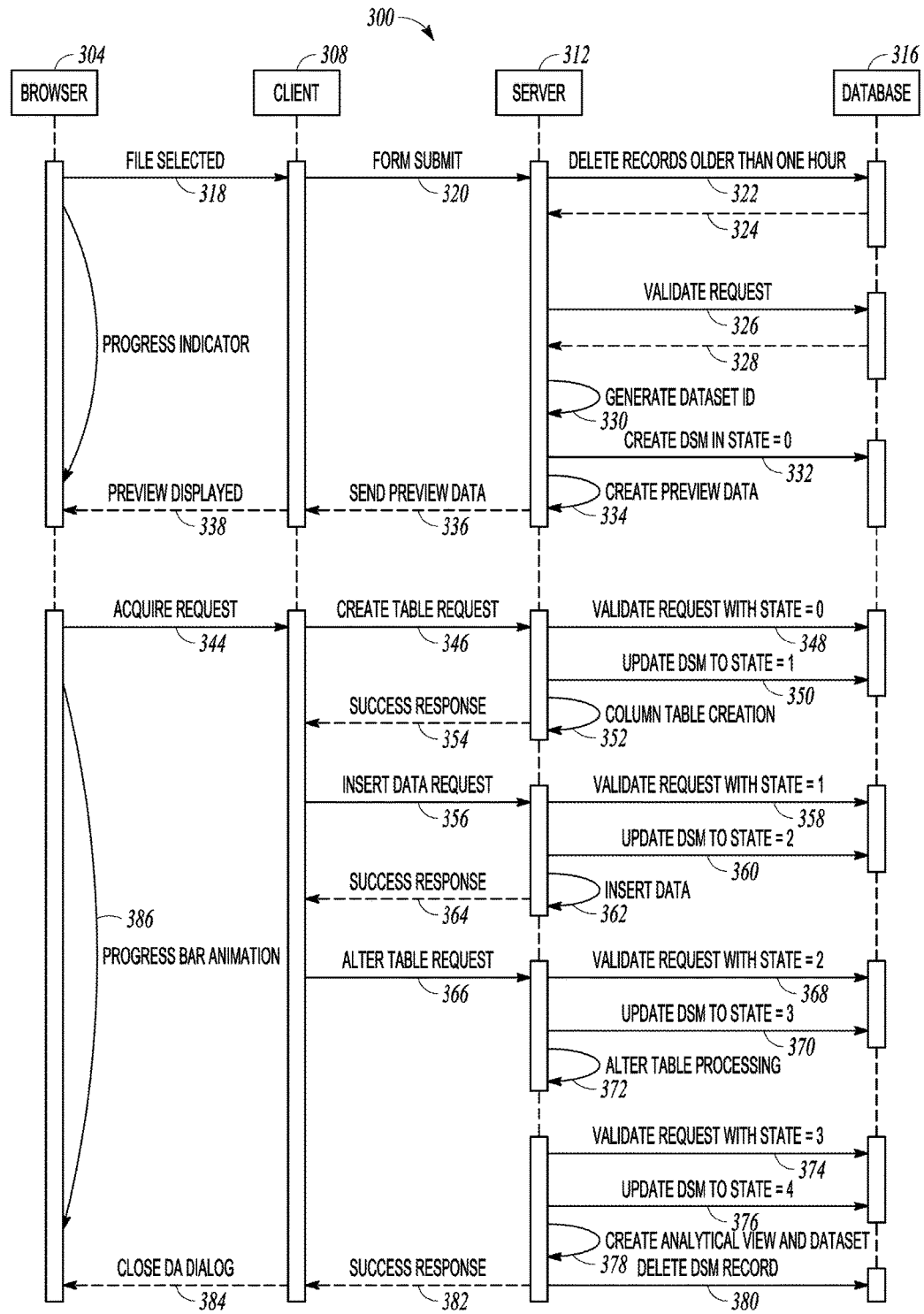
FIG. 3 is a sequence diagram of an example workflow for uploading a data file, in accordance with an example embodiment.

FIG. 3 is a sequence diagram 300 of an example workflow for uploading a data file, in accordance with an example embodiment. In one example embodiment, an uploading of a data file may be comprised of the following HTTP requests:

1. Preview data request;
2. Create database table request;
3. Insert data request;
4. Alter table request to assign respective data types to table columns; and
5. Create analytical view request.

In one example embodiment, a user may submit a file selection via a browser 304 to a client 308 (operation 318), and the client 308 may compose and submit a form to a server 312 to initiate the upload of the data file (operation 320). The server 312 may submit components of the upload request to a database management system 316 to validate the request (operation 326). The database management system 316 may then provide a response to the server 312 indicating whether the upload request is valid (operation 328). In addition, the server 312 may submit a request to the database management system 316 to delete records that are older than, for example, one hour (operation 322). The database management system 316 may respond by submitting an acknowledgement message to the server 312 acknowledging that the records have been deleted (operation 324).

Figure 4A:
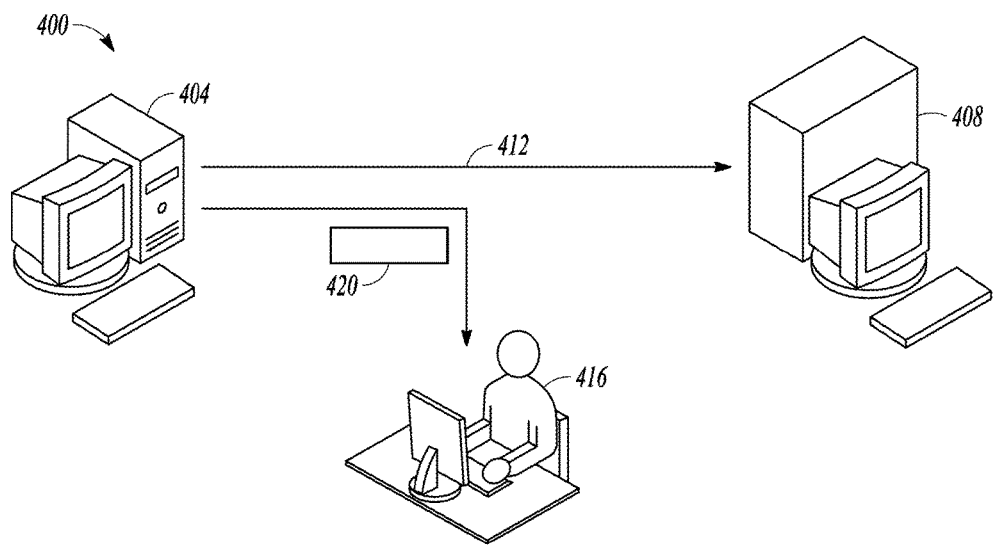
FIG. 4A illustrates a representation of an attacker intercepting a communication between a client device and a server, in accordance with an example embodiment.
Figure 4B:
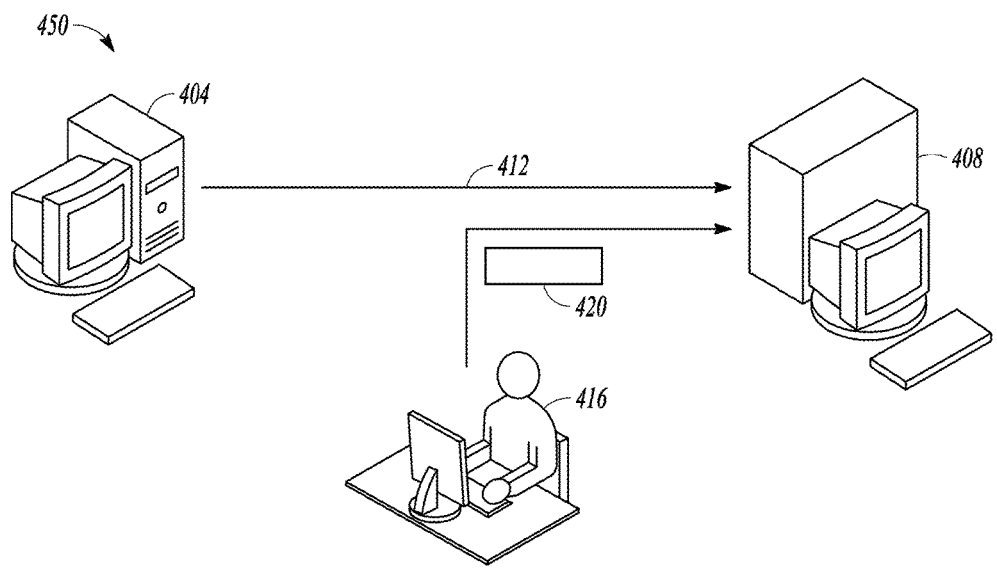
FIG. 4B illustrates a representation of an attacker replaying (e.g., retransmitting) the intercepted communication to the server, in accordance with an example embodiment.
Figures 4C, 5:
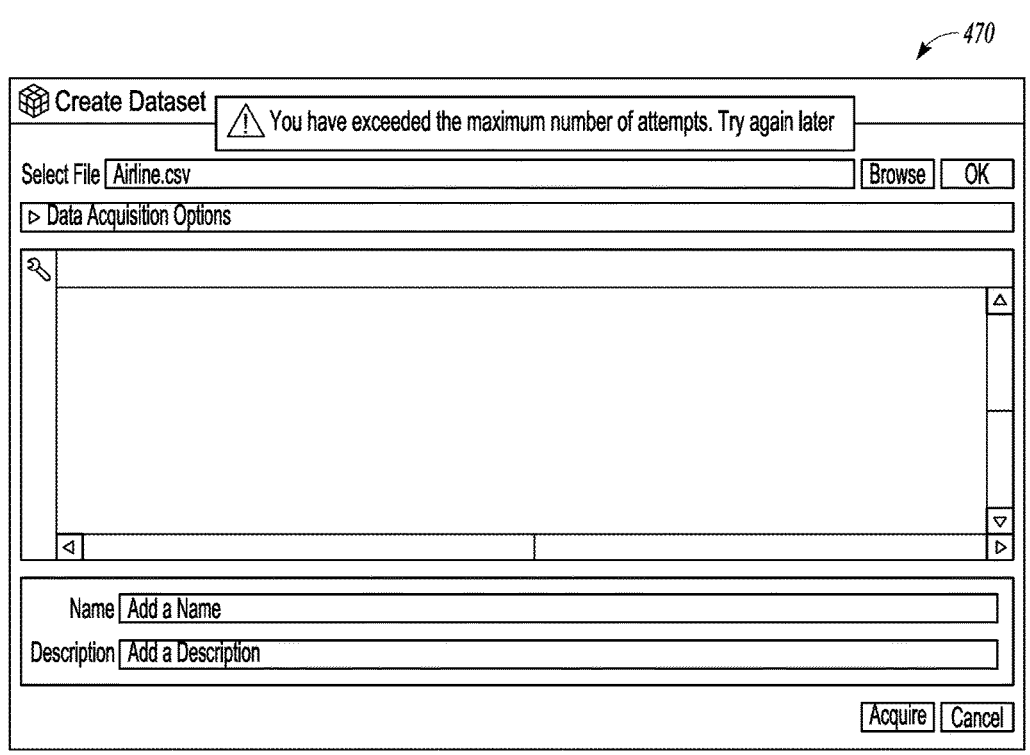
FIG. 4C illustrates an example error message indicating that the maximum number of messages has been exceeded, in accordance with an example embodiment.
FIG. 5 shows an initial state of a dataset master, in accordance with an example embodiment.

Assuming the upload request is validated, the server 312 may generate the corresponding data set identifier (operation 330) and may create a table identified as the DATASET_MASTER (with the state set to STATE 0) in the database management system 316 (operation 332), as illustrated in FIG. 5. The server 312 may also create the corresponding preview data (operation 334) and may send the preview data to the client 308 (operation 336). The client 308 may forward the preview data to the browser 304 for display to the user (operation 338).

In one example embodiment, a user may submit an acquisition request via the browser 304 to the client 308 (operation 344), and the client 308 may compose and submit a create table request to the server 312 to create the table used for the uploading of the data file (operation 346). The server 312 may communicate with the database management system 316 to validate the create table request (operation 348). The server 312 may then transition to STATE 1 and may update the DSM entry in the database management system 316 accordingly (operation 350).

The server 312 may create the column table (operation 352) and may acknowledge the successful creation of the column table via a success response sent to the client 308 (operation 354). The client 308 may submit an insert data request to the server 312 to insert the data for the upload operation (operation 356). The server 312 may validate the insert data request with the database management system 316 (operation 358) and, upon successful validation of the insert data request, the server 312 may transition to STATE 2 and may update the DSM entry in the database management system 316 accordingly (operation 360).

The server 312 may insert the uploaded data (operation 362) and may acknowledge the successful insertion of the data via a success response sent to the client 308 (operation 364).

In one example embodiment, the client 308 may compose and submit an alter table request to the server 312 to alter the created table (operation 366). The server 312 may communicate with the database management system 316 to validate the alter table request (with the state set to STATE 2) (operation 368). The server 312 may then transition to STATE 3 and may update the DSM entry in the database management system 316 accordingly (operation 370). The server 312 may perform the alter table processing (operation 372).

In one example embodiment, the client 308 may compose and submit a create analytical view request to the server 312 to create the analytical view (operation 372). The server 312 may then communicate with the database management system 316 to validate a create analytical view request (operation 374). The server 312 may then transition to STATE 4 and may update the DSM entry in the database management system 316 accordingly (operation 376).

The server 312 may create an analytical view(s) and corresponding dataset (operation 378) and may then delete the DSM record from the database management system 316 (operation 380). The server 312 may acknowledge the execution of the upload request by sending a success response to the client 308 (operation 382) and the client 308 may submit a request to the browser 304 to close the data acquisition dialog (operation 384).

In one example embodiment, a progress bar animation may be maintained by the browser 304 to inform a user of the progress of the upload operation as the upload operation is performed (operation 386).

In one example embodiment, Cross Site Request Forgery (XSRF) tokens for HTTP requests, conventionally used for XSRF attacks, may be provided for use in the validation of issued requests the XSRF tokens may be valid across a valid session for a user. That is, when a user logs in, a server may create an XSRF token that may be used by each request for the session and the server 312 may validate the requests based on the XSRF token. If a request is captured and replayed from a proxy or from any network sniffing tool, the requests may be resent and the server 312 may accept the request(s) as long as the user's identification and XSRF Token are valid.

FIG. 4A illustrates a representation 400 of an attacker 416 intercepting a communication 412 between a client device 404 and a server 408, in accordance with an example embodiment. In one example embodiment, the attacker 416 may intercept a message 420, such as a request message or an authentication message, and may retransmit the message 420 to the original destination host, such as the server 408. FIG. 4B illustrates a representation 450 of the attacker 416 replaying (e.g., retransmitting) the intercepted communication 412 to the server 408, in accordance with an example embodiment. The message 420 need not be read or parsed to be retransmitted to the original destination host. The replay of the message 420 may provide access by the attacker 416 to a restricted resource, such as the server 408. A number of unauthorized retransmissions of the message 420 may confuse the destination host with a potential flood of duplicate messages and may constitute a denial-of-service attack.

In the case of previewing data, a client may upload a file to the server 312. The server 312 may keep the file content in a temporary table and parse the data from the table content. In one example embodiment, a response of this request may have, for example, a maximum of 4 MB worth of data and may be shown to the user as a preview. If a user (e.g., an attacker) replays this request, the entire file content may be inserted into the temporary table as many times as the request is replayed. This has the potential to fill or overfill the database.

For a create database table request, the server 312 may create a columnar table to store the file data that may be used to create an analytical view. If a user (e.g., an attacker) replays this request, the server 312 may create as many columnar tables as the number of replay requests.

For an insert data request, the data from the temporary table may be inserted into the columnar table. If this request is replayed, the data from the temporary table may be inserted into the columnar table as many times as the number of received requests. If a user (e.g., an attacker) replays a request with the entire content for an hour at an interval of 1 millisecond, the table may grow to an enormous size. If a user replays the request to create analytical views, as many analytical views may be generated as the number of requests. Each of these actions may have the potential, for example, to cause the server to fail.

In one example embodiment, one or more of the following features may be provided to prevent or mitigate a replay attack:
1. throttling the number of parallel requests permitted for a user;
2. provisioning a unique tracking identifier for all the requests in one transaction; and
3. providing persistence of the transaction state.

In one example embodiment, the number of parallel requests for a user may be throttled, thus limiting the total number of outstanding requests. For example, a throttle may be set to five messages. This may be achieved by configuring a limit to the number of requests, such as data upload requests, that a valid user can issue at a given time. If a user reaches the limit, the user may be asked to wait for some time before submitting the next request and/or uploading the next dataset. The time and number of concurrent messages, such as upload requests, may be configured by a system administrator or other user. If a user exceeds the throttle limit, the user may be sent an error message and/or may be prevented from submitting additional messages. In addition, additional messages from the user may be ignored.

In one example embodiment, the system 100 may keep track of the data uploads which are requested by each user. If an unauthorized user captures an upload request and replays the request via a script or any other mechanism, the system 100 may not accept the messages after the throttle limit of five is reached. In this case, the data that has been uploaded and captured will be deleted after a defined time period, such as thirty minutes, and an error message will be issued to the user. FIG. 4C illustrates an error message 470 indicating that the maximum number of attempts (e.g., issued requests) has been exceeded, in accordance with an example embodiment.

In one example embodiment, a unique tracking identifier, such as a request identifier, may be issued for all of the requests in one transaction. In addition, the requests for the transaction may be assigned the same user identifier and the same authentication token. The unique tracking identifier may be generated, for example, by the client 308 and may be used as a transaction token for all the requests for the corresponding transaction, such as a file upload. For example, a unique request identifier that is based on a time of the upload request initiated by the user may be generated, for example, by the client 308. The request identifier may be sent in the first request submitted to the server 312 to indicate that a data upload transaction has started. The server 312 may receive the request and check if any other request or transaction with the same request identifier is in process and may issue an error message if another transaction with the same request identifier is active. The server 312 may also check the number of upload requests that are outstanding (in progress) for the given user.

The two cited checks may be performed using the persistent data stored in the server 312. If the number of requests that are in progress exceeds the configured throttling limit, the server 312 may issue an error message. For valid requests, the server 312 may generate another time-based unique identifier that may be used as a dataset identifier. In addition, the success response may include a dataset identifier generated by the server 312.

In one example embodiment, a persistence of the transaction state may be maintained and a defined sequence of steps may be followed to complete a transaction. The server 312 may track each request using the current state of the transaction and the unique request identifier. All requests may be required to follow the same sequence of steps as indicated by the state of the transaction. If a request(s) do not follow the same sequence (as indicated by the state of the transaction), an error message may be issued and/or the request(s) that fail to follow the proper sequence (as indicated by the state of the transaction) may be purged or ignored. In one example embodiment, if the transaction is currently in step 2, it will not be possible for the replay attack to replay step 2 or to skip a step and proceed directly to step 4.

In one example embodiment, all the requests for one transaction need to be identified using the same identifier, such as the same request identifier. The server 312 may maintain the state of each request so that a particular request will be served by the server 312 only once. The persistence of state may be stored in a database table that, for example, may be on the server 312. For example, the table may be identified as the DATASET_MASTER (referred to herein as the DSM). The DSM may contain the corresponding state and the following columns to capture and validate the requests: REQUEST_ID, USER_ID, DATASET_ID, STATE, FILE_NAME, and CREATION_TIME. The corresponding DSM record may be deleted when the transaction completes successfully or when an error occurs. If a user abandons a transaction that is in progress, the state of the DSM record will remain the same. In one example embodiment, the server 312 may delete the entries from the DSM table based on the CREATION_TIME. For example, the server 312 may delete the DSM record if more than 30 minutes has elapsed since the creation time of the DSM. In one example embodiment, the various states of each record in the DSM are as follows:

0—Preview state
1—Create columnar table state
2—Insert data (to columnar table) state
3—Alter table complete state
4—Analytical view created state In one example, consider a user with the user identifier TESTUSER who chooses a file entitled DATA_1.csv and initiates an upload process. This may be a multipart request that may contain the entire file content along with the file name and the unique request identifier (e.g., REQUEST_ID=REQ_123456789_1) generated by the client 308. After the server 312 receives the request, the server 312 may validate the current number of outstanding requests for the user by the count of entries in the DSM table corresponding to the USER_ID=TESTUSER. If this count does not exceed the configured throttling limit, the server 312 may generate a dataset identifier (for example, DATASET_ID=DATASET_123456789_1) which may be a unique identifier based, for example, on a current time of day. The server 312 may create a record in the DSM table using the DATASET_ID=DATASET_123456789_1, the REQUEST_ID=REQ_123456789_1, the USER_ID=TESTUSER from the HTTP request, the state of STATE 0, and a CREATION_TIME as indicated in the current timestamp. FIG. 5 shows an initial state 500 of the DSM, in accordance with an example embodiment.

FIGS. 6A and 6B are a flowchart of an example workflow 600 for management of a replay attack, in accordance with an example embodiment. The workflow 600 may be used by, for example, a variety of web applications to prevent and/or mitigate replay attacks. The client 308 and the server 312 may need to define the order of requests and the server 312 may need to throttle the number of requests, along with maintaining the state for each request and each transaction. The validation of each request may be based on the state of the request along with the variables defined in the protocol. As described above, REQUEST_ID, DATASET_ID, USER_ID and the transaction state may be used as the variables for the validation of each request.

In one example embodiment, the server 312 may insert the file content into a temporary table and may return a response that contains the DATASET_ID generated by the server 312. FIG. 7 is an example screenshot 700 of the database table before the file is uploaded, in accordance with an example embodiment. As illustrated in FIG. 7, the database is empty at this point in time.

In one example embodiment, a user may select a file (operation 604) via, for example, a web browser. The client 308 may read the data of the selected (operation 606), may generate a unique request identifier (operation 608), and may send the upload request via an HTTP request to the server 312 (operation 610).

Figure 8:
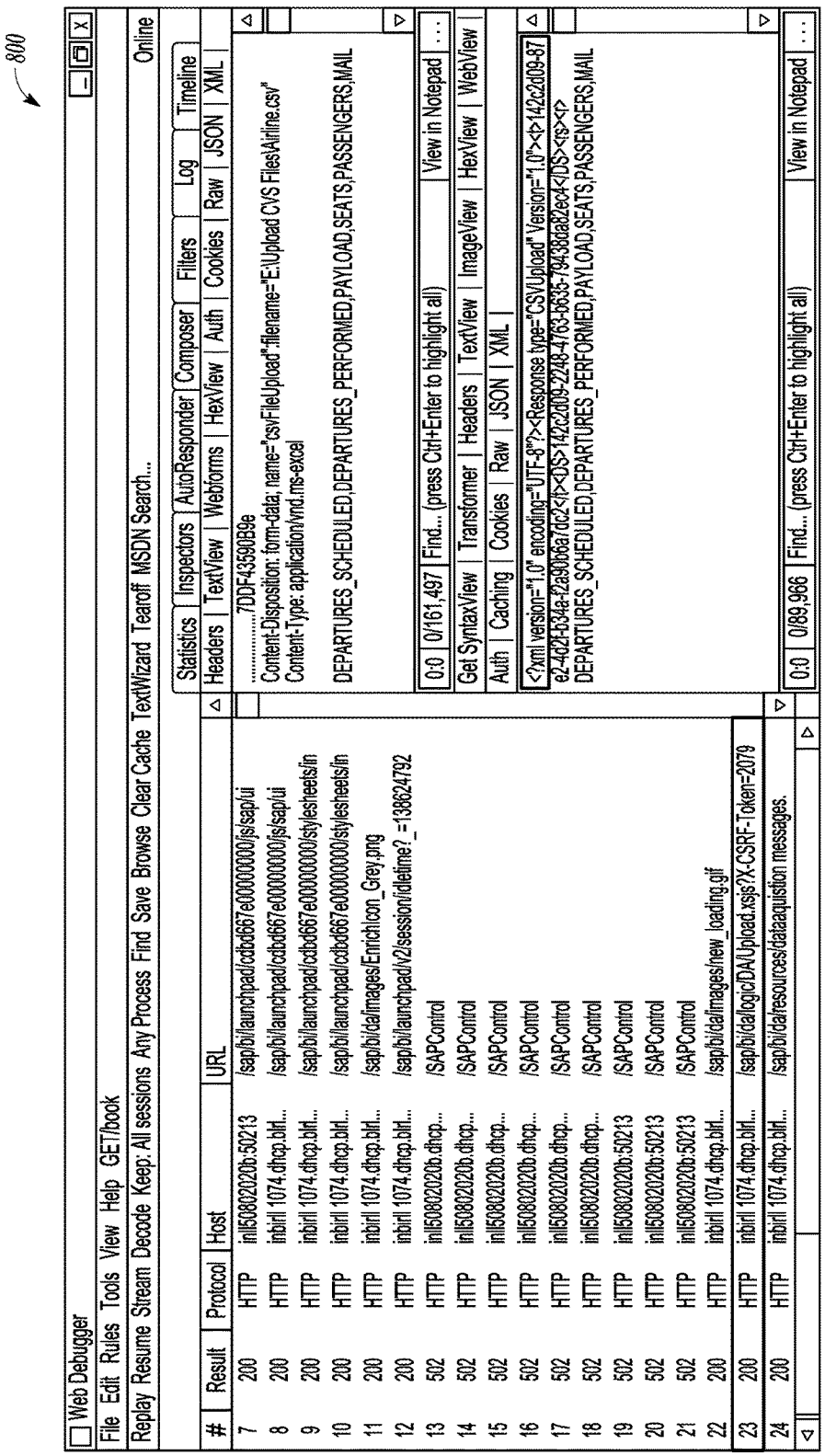
FIG. 8 is an example screenshot of a multipart request to upload a file to a server, in accordance with an example embodiment.

FIG. 8 is an example screenshot 800 of a multipart upload request to upload a file to the server 312, in accordance with an example embodiment. The data of the screenshot 800 may be obtained from an HTTP debugging proxy server application that captures and logs HTTP and HTTPS traffic. The highlighted sections are the upload (POST) request and the dataset name generated by the server 312; the latter may be returned to the client 308 as a Data Set (DS) name. A POST request is a request method supported by the HTTP protocol that, for example, requests a server to store the data included in the body of the POST request message.

FIG. 9 is an example screenshot 900 of the database table after the file content has been sent to the server 312, in accordance with an example embodiment. The state of the entry at this point in time is STATE 0. The server 312 may validate the received upload request (operation 612) and may perform a test to determine if the upload request is valid (operation 614). If the upload request exceeds the throttling limit, the requesting user may be issued an error message, such as the error message shown in FIG. 4C (operation 696).

If the upload request does not exceed the throttling limit, an entry in the DSM table may be created (operation 616), a preview of the upload may be generated (operation 618), and a response for return to the client 308 via an HTTP message may be created (operation 620). The client 308 may receive the HTTP message and may forward the rendered preview to the client 308 (operation 622) for display to the user via the browser 304 (operation 624).

In one example embodiment, after the user approves the preview (operation 626), the upload process may be cancelled or may proceed with an acquisition process that may be started by clicking on an acquire icon displayed by the browser 304. If the acquisition is cancelled after the preview, a delete request may be sent, for example, by the client 308 to delete the DSM entry from the table (named DATASET_MASTER) and to delete the file content from the temporary table. If a user proceeds with acquisition, a create table request may be submitted to the server 312 (operation 628). The request may have a type defined as CREATETABLE and may comprise a DATASET_ID, a REQUEST_ID, a USER_ID, and column names for the table.

In one example embodiment, the server 312 may validate the request by querying the DSM table using the attributes: DATASET_ID, REQUEST_ID, and USER_ID with the state as STATE 0 (operation 630). A test may be performed to determine if the upload request is valid (operation 632). (This query may be a SELECT query for an update that may lock the record in the DSM table.) If a valid entry is found in the DSM table, the server 312 may update the DSM record to STATE 1 (as indicated in FIG. 6B) and may release the lock on the DSM record. Since the DSM record was locked during the validation (until the DSM record was updated to the next state), any duplicate requests that have been sent since the DSM record was locked will fail in the validation process. If any duplicate records are sent after the DSM record is updated (the state is updated to STATE 1), the SELECT query with STATE 0 will not return any records, due to, for example, the mismatch in states; hence, the validation will fail. This ensures that requests for table creation cannot be repeated or replayed.

Figure 10:
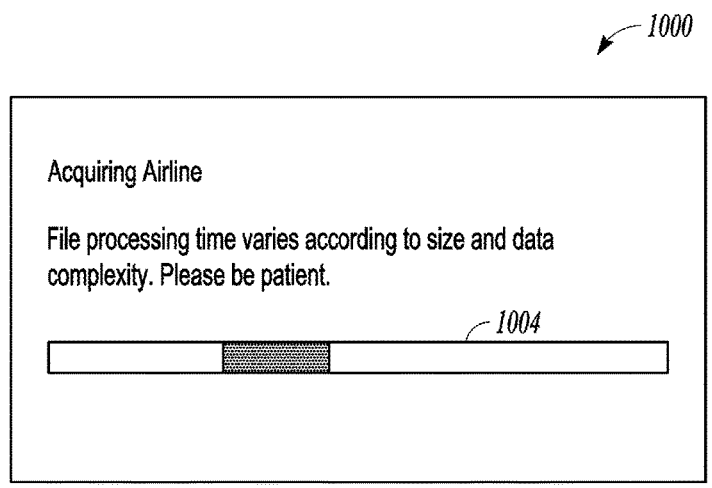
FIG. 10 is an example screenshot of an upload progress indicator, in accordance with an example embodiment.

In one example embodiment, if an error occurs (such as the upload request being invalid), the server 312 may delete the DSM record before returning an error response (operation 696). For valid CREATETABLE requests, the server 312 may update the state of the DSM entry to STATE 1 (operation 634), create the database table (operation 634 and may generate a response for the client 308 indicating the successful creation of the database table (operation 638). During the acquisition, an upload progress indicator 1004 may be displayed while, for example, the client 308 sends the requests to create the table and the analytical views. FIG. 10 is an example screenshot 1000 of the upload progress indicator 1004, in accordance with an example embodiment.

Figure 11:
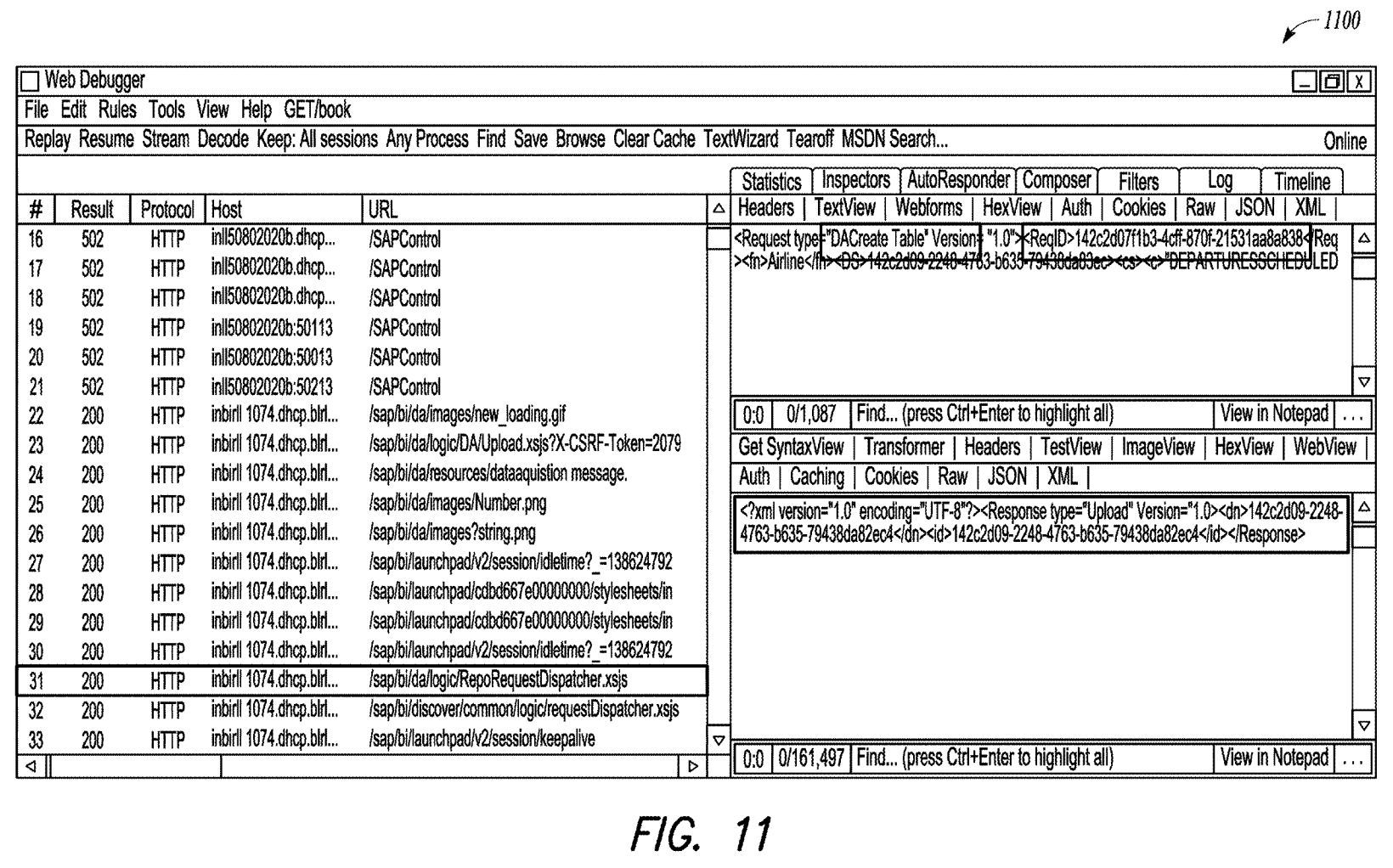

FIG. 11 is an example screenshot 1100 of a captured create table (POST) request, in accordance with an example embodiment. The highlighted portions show the POST request and response for the create table operation with the data set name and the request identifier. Once the response is received, the insert data request may be submitted as the second HTTP request using INSERTDATA as the request type along with the REQUEST_ID, DATASET_ID, and USER_ID (operation 640). The server 312 may validate the request in the same fashion using this information (with the state as STATE 1) (operation 642). The record will be locked from the time the insert data request is received and the record is updated until the transition to the next state (STATE 2) is executed. A test may be performed to determine if the insert data request is valid (operation 644). If the request is replayed or repeated, the server 312 validation may fail either due to the lock or due to a change of state. This ensures that the same request cannot be repeated or replayed. For valid requests, the server 312 may start the process of inserting data into the columnar table from the temporary table. For example, the server 312 may update the state of the DSM to STATE 2 (operation 646), the data may be inserted into the columnar table from the temporary table (operation 648), and a response for the client 308 may be generated and sent (operation 650). If an error occurs, the server 312 may delete the DSM entry before sending the error response to the user.

Figure 13:
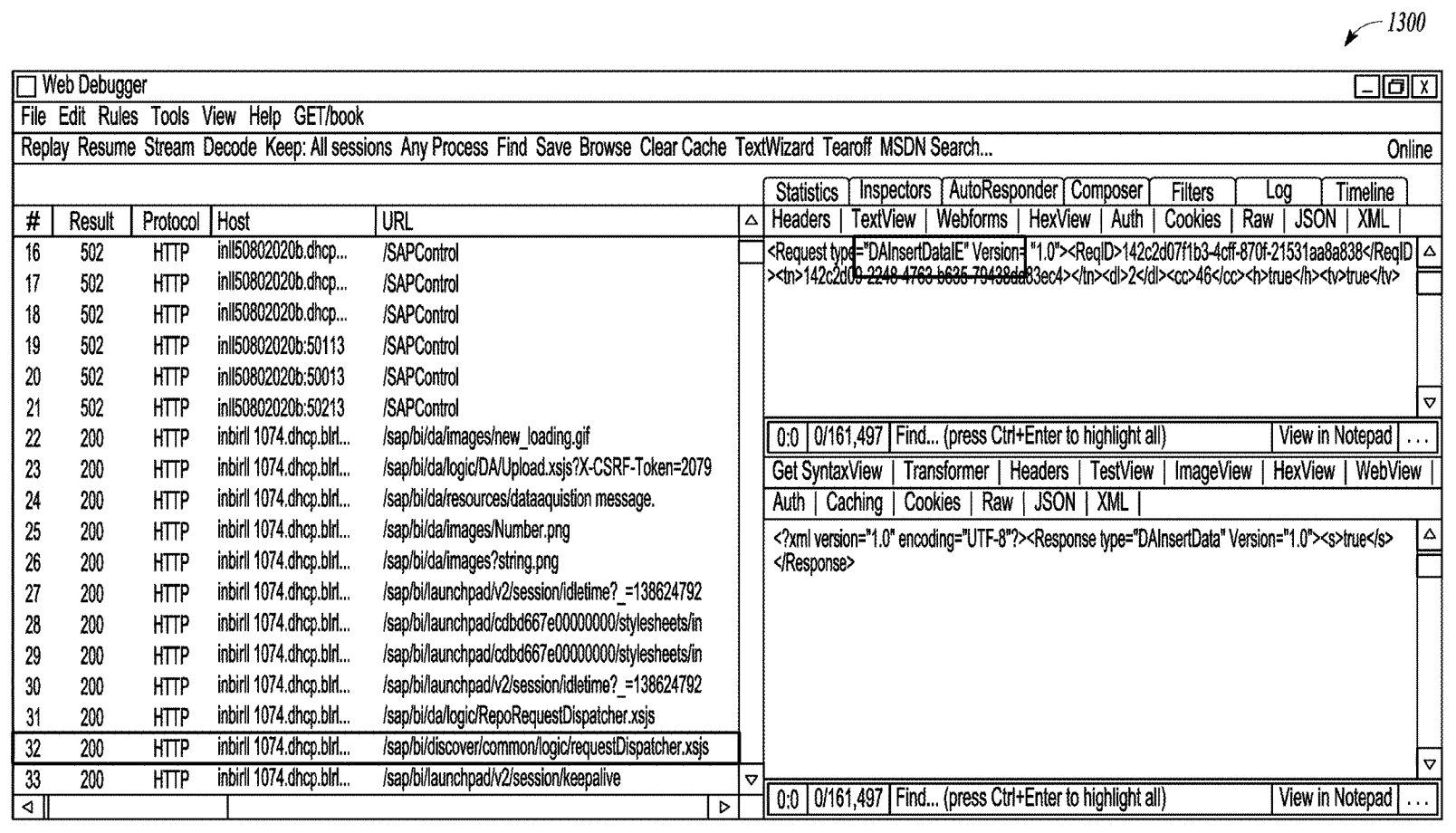

FIG. 12 is an example screenshot 1200 of the database state after the transition to STATE 1, in accordance with an example embodiment. FIG. 13 is a screenshot 1300 of the request/response after data has been inserted in the database, in accordance with an example embodiment. In one example embodiment, the state is updated to STATE 2 before the response for insert data is sent to the client 308. FIG. 14 is an example screenshot 1400 of the database state after the transition to STATE 2, in accordance with an example embodiment.

Figure 15:
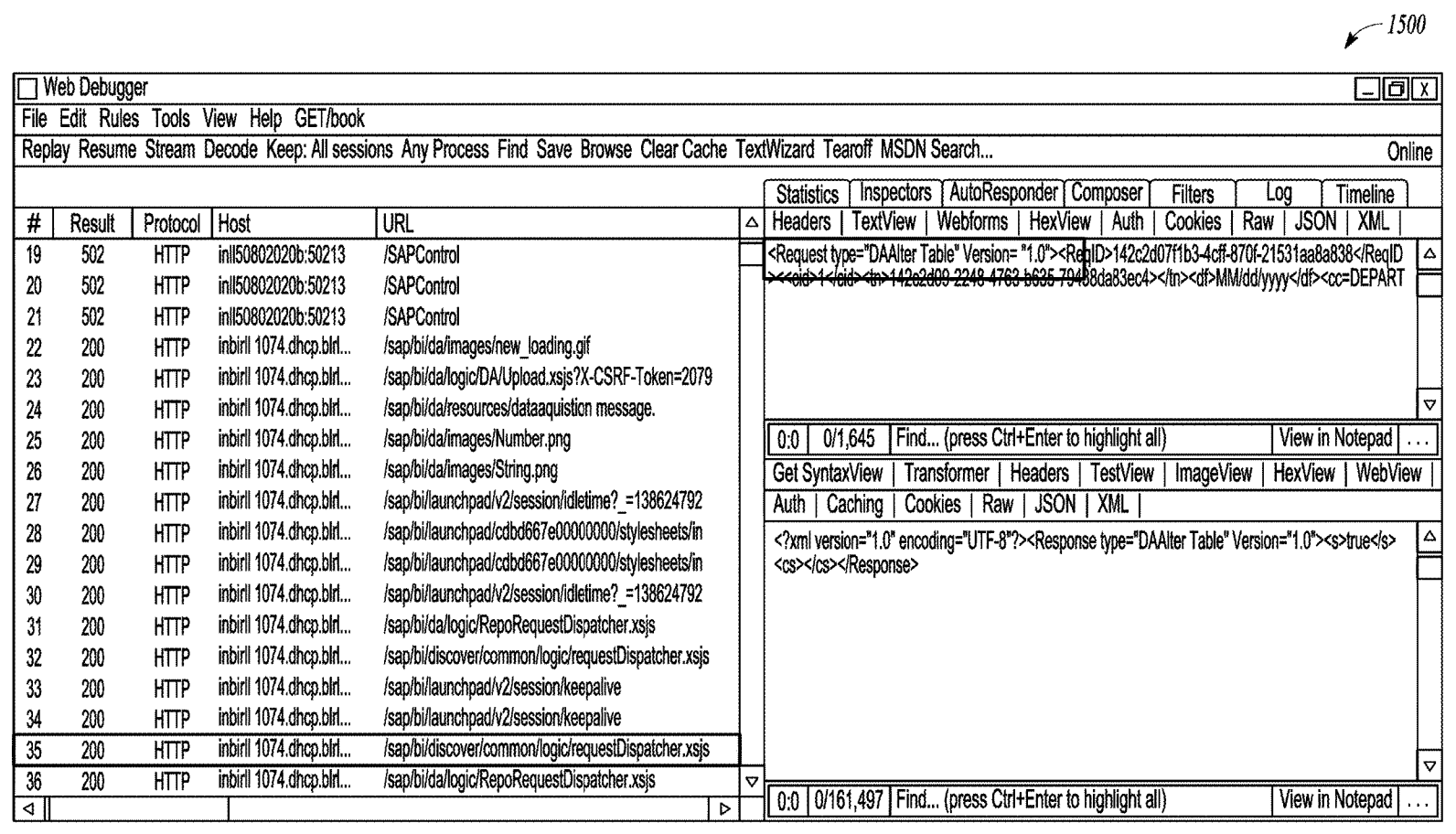

FIG. 15 is an example screenshot 1500 of the request/response after the alter table request, in accordance with an example embodiment. The client 308 may send the request for altering the table in order to update the database types for the columns based on the data inserted. After the response is received to the insert data request, the alter table request may be submitted as the next HTTP request using ALTERTABLE the request type along with REQUEST_ID, DATASET_ID, and USER_ID (operation 652). The server 312 may validate the request using this information with the state as STATE 2 (operation 654). A test may be performed to determine if the alter table request is valid (operation 656). The DSM record may be locked from the time the request is received and the DSM record is updated until the transition to the next state (STATE 3) is executed. If the request is replayed or repeated, the server validation may fail either due to the DSM record lock or due to the change of state. This ensures that the same request cannot be repeated or replayed. For valid requests, the server 312 may create and execute the alter table query to change the data types of the columnar table to match the data in the table. For example, the server 312 may update the state of the DSM to STATE 3 (operation 658), the table may be altered (operation 660), and a response may be generated and sent to the client 308 (operation 662). If an error occurs, the server 312 may delete the DSM entry before sending the error response to the user. The server 312 may send the response to the client 308 to indicate that the alter table is complete; the response may be received by the client 308 (operation 664). FIG. 16 is an example screenshot 1600 of the database state after the transition to STATE 3, in accordance with an example embodiment.

Figure 17:
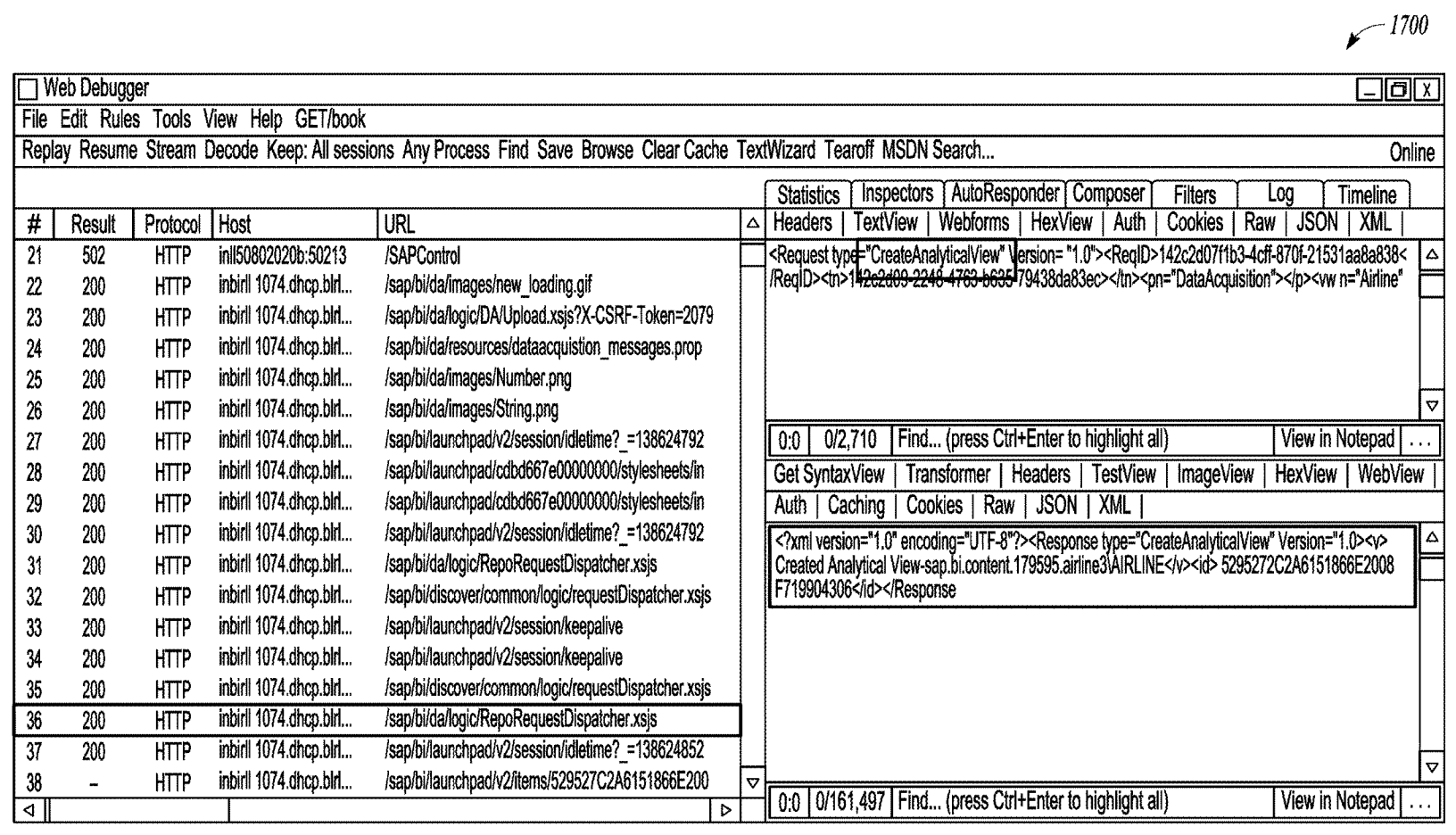

FIG. 17 is an example screenshot 1700 of a response to the create analytical view request, in accordance with an example embodiment. After the response for the alter table request is received, the client 308 may send the request to create an analytical view. The analytical view may be initiated by sending the next HTTP request with CREATE-ANVIEW as the request type along with the REQUEST_ID, DATASET_ID, and USER_ID. The server 312 may validate the request using this information with the state in STATE 3 (operation 666). A test may be performed to determine if the create analytical view request is valid (operation 668). The record may be locked from the time request is received and the DSM record is updated until the transition to the next state (STATE 4) is executed. If the request is replayed or repeated, the server validation may fail either due to the DSM record lock or due to the change of state. This ensures that the same request cannot be repeated or replayed. For valid requests, the server 312 may create one or more analytical views and may send the response to the client 308. For example, the server 312 may update the state of the DSM to STATE 4 (operation 670), the analytical view may be created (operation 672), and a response for the client 308 may be generated and sent (operation 674). Before sending the response, the server 312 may delete the entry from the DSM table. If an error occurs, the server 312 may delete the DSM entry before sending the error response to the client 308. In one example embodiment, the user is shown the analytical view with the success notification (operation 676).

FIG. 18 illustrates the removal of the DSM entry, in accordance with an example embodiment. Upon completion of the update operation, the DSM entry may be removed from the corresponding table 1800.

Figure 19:
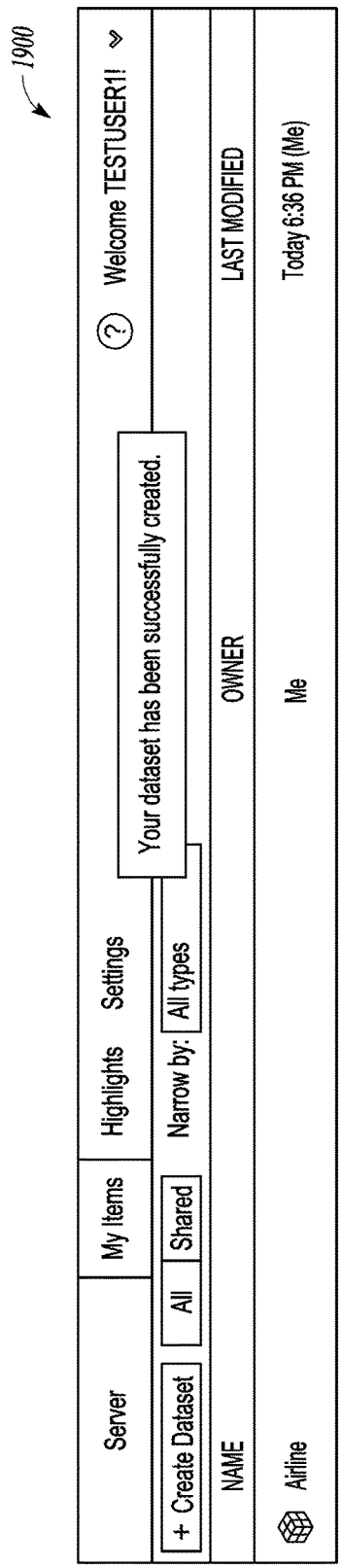
FIG. 19 is an example screenshot of a notification of a successful acquisition, in accordance with an example embodiment.

FIG. 19 is an example screenshot of a notification 1900 for a successful acquisition, in accordance with an example embodiment. A user may be shown the notification after successful completion of the acquisition. If any of the messages are replayed, the server 312 may send an error message, since the entry of the record in the DSM table that is used for validation has been either updated to the next state or deleted at the end of the workflow. This ensures that no requests can be replayed or sent out of sequence by any malicious users on the network.

Figure 20:
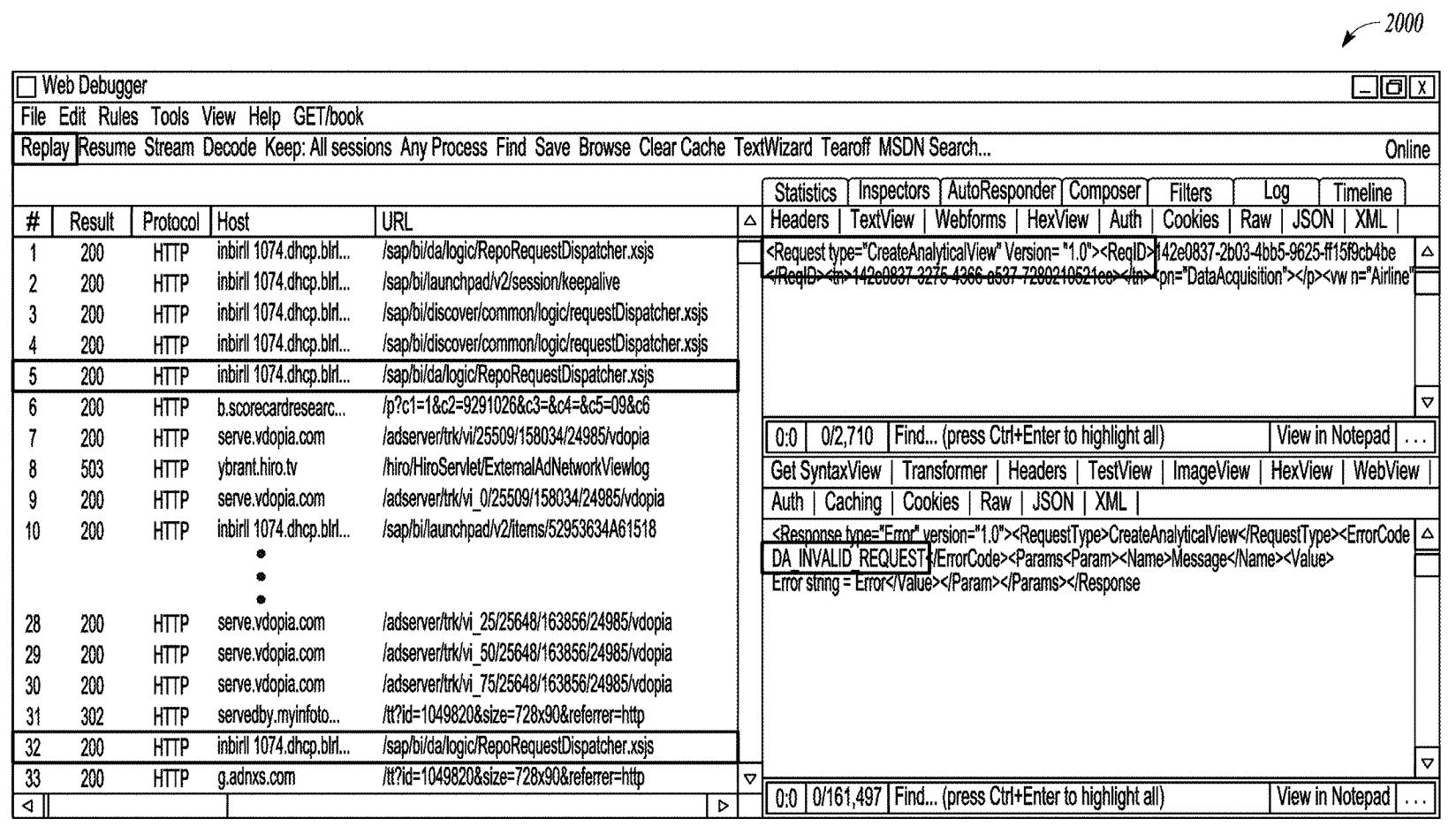

FIG. 20 is an example screenshot 2000 showing the detection and capture of an invalid request, in accordance with an example embodiment. The highlighted sections show the replay option, the original request, and the replayed request with the response for the replayed request and error code DA_INVALID_REQUEST.

Figure 21:
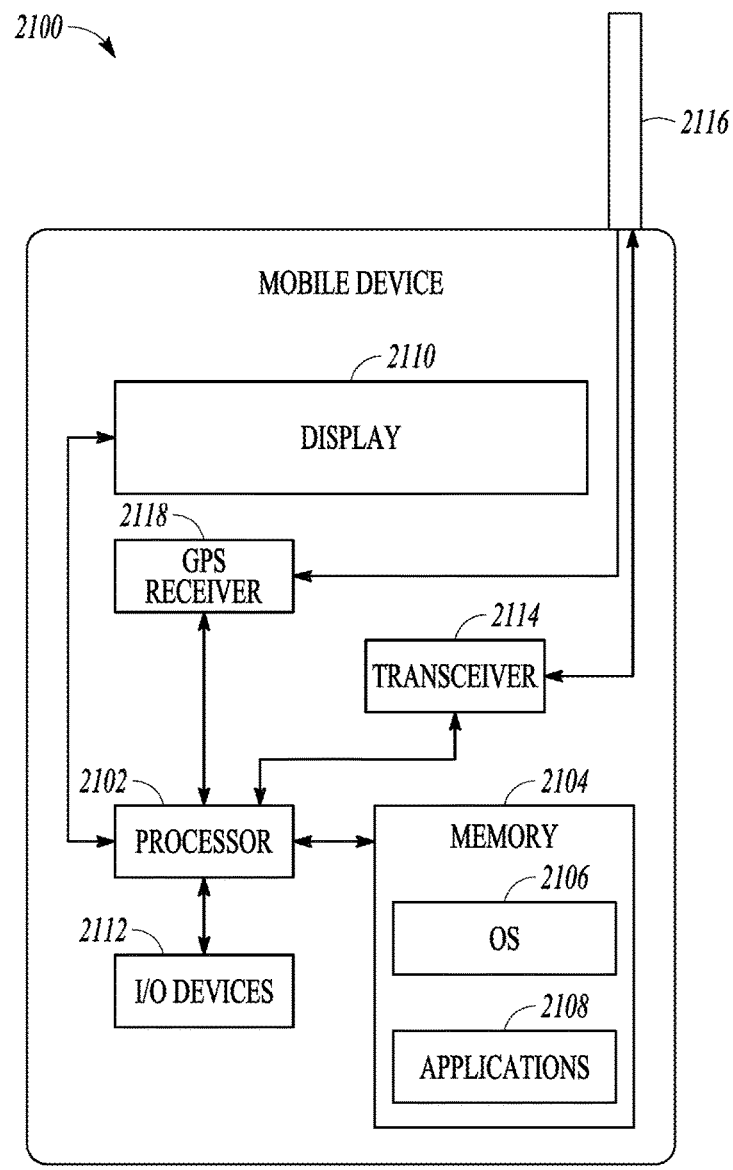
FIG. 21 is a block diagram illustrating a mobile device, according to an example embodiment.

FIG. 21 is a block diagram illustrating a mobile device 2100, according to an example embodiment. The mobile device 2100 can include a processor 2102. The processor 2102 can be any of a variety of different types of commercially available processors suitable for mobile devices 2100 (for example, an XScale architecture microprocessor, a Microprocessor without Interlocked Pipeline Stages (MIPS) architecture processor, or another type of processor). A memory 2104, such as a random access memory (RAM), a Flash memory, or other type of memory, is typically accessible to the processor 2102. The memory 2104 can be adapted to store an operating system (OS) 2106, as well as applications 2108, such as a mobile location enabled application that can provide location based services (LBSs) to a user. The processor 2102 can be coupled, either directly or via appropriate intermediary hardware, to a display 2110 and to one or more input/output (I/O) devices 2112, such as a keypad, a touch panel sensor, and a microphone. Similarly, in some embodiments, the processor 2102 can be coupled to a transceiver 2114 that interfaces with an antenna 2116. The transceiver 2114 can be configured to both transmit and receive cellular network signals, wireless data signals, or other types of signals via the antenna 2116, depending on the nature of the mobile device 2100. Further, in some configurations, a GPS receiver 2118 can also make use of the antenna 2116 to receive GPS signals.

Figure 22:
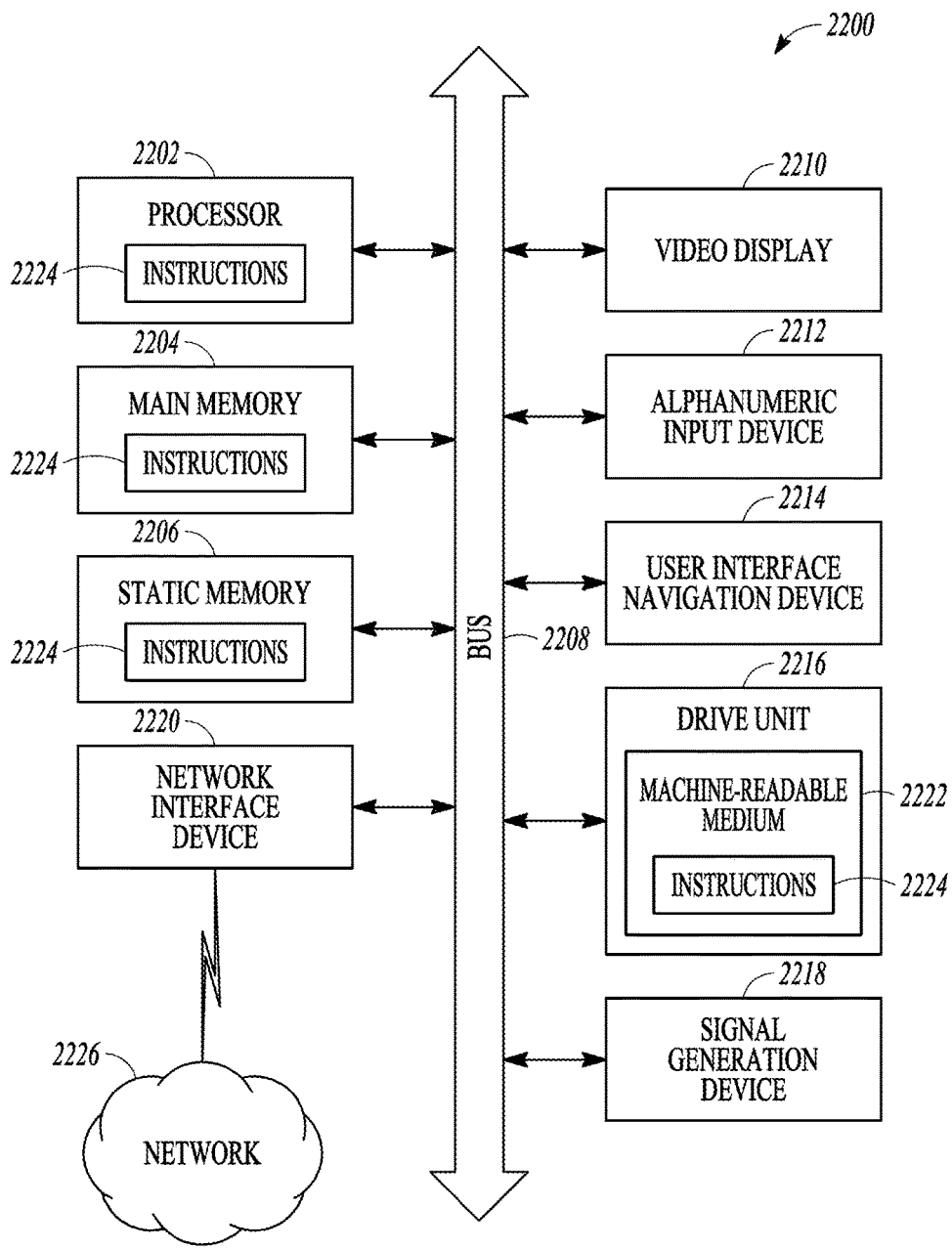
FIG. 22 is a block diagram of a computer processing system within which a set of instructions may be executed for causing the computer to perform any one or more of the methodologies discussed herein.

FIG. 22 is a block diagram of a computer processing system 2200 within which a set of instructions may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 2200 includes a processor 2202 (e.g., a central processing unit (CPU), a graphics processing unit (GPU), or both), a main memory 2204, and a static memory 2206, which communicate with each other via a bus 2208. The computer processing system 2200 may further include a video display 2210 (e.g., a plasma display, a liquid crystal display (LCD), or a cathode ray tube (CRT)). The computer processing system 2200 also includes an alphanumeric input device 2212 (e.g., a keyboard), a user interface (UI) navigation device 2214 (e.g., a mouse and/or touch screen), a drive unit 2216, a signal generation device 2218 (e.g., a speaker), and a network interface device 2220.

The drive unit 2216 includes machine-readable medium 2222 on which is stored one or more sets of instructions 2224 and data structures embodying or utilized by any one or more of the methodologies or functions described herein. The instructions 2224 may also reside, completely or at least partially, within the main memory 2204, the static memory 2206, and/or the processor 2202 during execution thereof by the computer processing system 2200, the main memory 2204, the static memory 2206, and the processor 2202 also constituting tangible machine-readable media 2222.

The instructions 2224 may further be transmitted or received over a network 2226 via the network interface device 2220 utilizing any one of a number of well-known transfer protocols (e.g., Hypertext Transfer Protocol).

While the machine-readable medium 2222 is shown in an example embodiment to be a single medium, the term "machine-readable medium" should be taken to include a single medium or multiple media (e.g., a centralized or distributed database, and/or associated caches and servers) that store the one or more sets of instructions 2224. The term "machine-readable medium" shall also be taken to include any medium that is capable of storing, encoding, or carrying a set of instructions 2224 for execution by the computer and that cause the computer to perform any one or more of the methodologies of the present application, or that is capable of storing, encoding, or carrying data structures utilized by or associated with such a set of instructions 2224. The term "machine-readable medium" shall accordingly be taken to include, but not be limited to, solid-state memories, and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of mitigating a replay attack, the method comprising:

obtaining a first request associated with a transaction;

associating a request identifier of the first request with the transaction;

comparing a count of outstanding requests associated with a user to a throttling limit;

processing the first request if a request type and the request identifier of the first request corresponds to a current state of the transaction, the first request is an only request received having the request type and the request identifier of the first request, and the count of outstanding requests does not violate the throttling limit, the current state being one of a plurality of states for processing the transaction;

denying the first request if the request type of the first request does not correspond to the current state of the transaction, another received request has a same request type and a same request identifier of the first request, or the count of outstanding requests associated with the user violates the throttling limit;

obtaining an additional request associated with the transaction;

processing the additional request if a corresponding request identifier of the additional request matches the request identifier associated with the transaction; and denying the additional request if the corresponding request identifier of the additional request does not match the request identifier associated with the transaction.

2. The method of claim 1, wherein the request identifier is used as a tracking identifier.

3. The method of claim 1, wherein the request identifier is based on a time of a creation of the first request.

4. The method of claim 1, wherein a same request identifier is utilized for all valid requests of the transaction.

5. The method of claim 1, further comprising:
obtaining a second additional request;
processing the second additional request if a request type of the second additional request corresponds to the current state of the transaction; and
denying the second additional request if the request type of the additional request does not correspond to the current state of the transaction.

6. The method of claim 5, wherein the current state is one of a preview state, a create columnar table state, a data insert state, an alter table state, and an analytical view creation state.

7. The method of claim 1, wherein the denying the first request comprises one or more of ignoring the first request, preventing submission of the first request, delaying processing of the first request, and requesting the user to delay submitting additional requests.

8. An apparatus for mitigating a replay attack, comprising:
a processor; and
memory to store instructions that; when executed by the processor; cause the processor to perform operations comprising:
obtaining a first request associated with a transaction;
associating a request identifier of the first request with the transaction;
comparing a count of outstanding requests associated with a user to a throttling limit;
processing the first request if a request type and the request identifier of the first request corresponds to a current state of the transaction, the first request is an only request received having the request type and the request identifier of the first request; and the count of outstanding requests does not violate the throttling limit, the current state being one of a plurality of states for processing the transaction;
denying the first request if the request type of the first request does not correspond to the current state of the transaction, another received request has a same request type and a same request identifier of the first request, or the count of outstanding requests associated with the user violates the throttling limit;
obtaining an additional request associated with the transaction;
processing the additional request if a corresponding request identifier of the additional request matches the request identifier associated with the transaction; and
denying the additional request if the corresponding request identifier of the additional request does not match the request identifier associated with the transaction.

9. The apparatus of claim 8, wherein the request identifier is used as a tracking identifier.

10. The apparatus of claim 8, wherein the request identifier is based on a time of a creation of the first request.

11. The apparatus of claim 8, wherein a same request identifier is utilized for all valid requests of the transaction.

12. The apparatus of claim 8, wherein the current state is one of a preview state, a create columnar table state, a data insert state, an alter table state, and an analytical view creation state.

13. The apparatus of claim 8, wherein mitigation module is further configured to perform operations comprising:
obtaining a second additional request;
processing the second additional request if a request type of the second additional request corresponds to the current state of the transaction; and
denying the second additional request if the request type of the additional request does not correspond to the current state of the transaction.

14. The apparatus of claim 13, wherein the current state is one of a preview state, a create columnar table state, a data insert state, an alter table state, and an analytical view creation state.

15. The apparatus of claim 8, wherein the denying the first request comprises one or more of ignoring the first request, preventing submission of the first request, delaying processing of the first request, and requesting the user to delay submitting additional requests.

16. A non-transitory machine-readable storage medium comprising instructions that, when executed by one or more processors of a machine, cause the machine to perform operations comprising:
obtaining a first request associated with a transaction;
associating a request identifier of the first request with the transaction;
comparing a count of outstanding requests associated with a user to a throttling limit;
processing the first request if a request type and the request identifier of the first request corresponds to a current state of the transaction, the first request is an only request received having the request type and the request identifier of the first request, and the count of outstanding requests does not violate the throttling limit, the current state being one of a plurality of states for processing the transaction;
denying the first request if the request type of the first request does not correspond to the current state of the transaction, another received request has a same request type and a same request identifier of the first request, or the count of outstanding requests associated with the user violates the throttling limit;
obtaining an additional request associated with the transaction;
processing the additional request if a corresponding request identifier of the additional request matches the request identifier associated with the transaction; and
denying the additional request if the corresponding request identifier of the additional request does not match the request identifier associated with the transaction.

17. The non-transitory machine-readable storage medium of claim 16, wherein a same request identifier is utilized for all valid requests of the transaction.

18. The non-transitory machine-readable storage medium of claim 16, wherein the current state is one of a preview state, a create columnar table state, a data insert state, an alter table state, and an analytical view creation state.

19. The non-transitory machine-readable storage medium of claim 16, further comprising instructions that, when executed by the one or more processors of the machine, cause the machine to perform operations comprising:
   obtaining a second additional request;
   processing the second additional request if a request type of the second additional request corresponds to the current state of the transaction; and
   denying the second additional request if the request type of the additional request does not correspond to the current state of the transaction.

\* \* \* \* \*